US012322272B2

(12) United States Patent
Holla et al.

(10) Patent No.: US 12,322,272 B2
(45) Date of Patent: Jun. 3, 2025

(54) METHODS AND SYSTEMS FOR DYNAMIC ALARM PRIORITIZATION IN A BUILDING CONTROL SYSTEM

(71) Applicant: Honeywell International Inc., Charlotte, NC (US)

(72) Inventors: Chaithanya Holla, Bangalore (IN); Balamurugan Boominathan, Madurai (IN); Jnana Prakash Rana, Bangalore (IN); Mihir Surati, Surat (IN); Yousuf Imran S, Bangalore (IN); Pradeep Rajan, Madurai (IN); Abdul Gaffar, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 101 days.

(21) Appl. No.: 18/457,773

(22) Filed: Aug. 29, 2023

(65) Prior Publication Data

US 2025/0078644 A1 Mar. 6, 2025

(51) Int. Cl.
*G08B 25/00* (2006.01)

(52) U.S. Cl.
CPC .................................... *G08B 25/00* (2013.01)

(58) Field of Classification Search
CPC ...................................................... G08B 25/00
See application file for complete search history.

(56) References Cited

U.S. PATENT DOCUMENTS

| | | | | |
|---|---|---|---|---|
| 8,890,675 | B2 | 11/2014 | Ranjan et al. | |
| 9,754,478 | B1 * | 9/2017 | Fuller | G05B 15/02 |
| 2010/0073159 | A1 * | 3/2010 | Schmickley | G05B 19/042 340/517 |
| 2022/0051548 | A1 * | 2/2022 | Pellegrini | H04M 3/436 |

FOREIGN PATENT DOCUMENTS

| | | | |
|---|---|---|---|
| CN | 110232800 | A | 9/2019 |

OTHER PUBLICATIONS

Parsa et al., "Enhancing Alarm Prioritization in the Alarm Management Lifecycle," IEEE Access, vol. 10, pp. 99-111, Date of publication Dec. 23, 2021. Date of Current version Jan. 4, 2022. aaa.

* cited by examiner

*Primary Examiner* — Travis R Hunnings
(74) *Attorney, Agent, or Firm* — Seager, Tufte & Wickhem, LLP

(57) ABSTRACT

Each alarm received over time is associated with one or more alarm parameters that each provide a priority factor. Each of the plurality of alarms are associated with an open state until the corresponding alarm is acted upon in a predetermined manner by an operator. For each of the plurality of alarms that remain in the open state, a static priority level is based on the priority factors provided by the one or more alarm parameters associated with the corresponding alarm, and a dynamic priority level is determined that is based at least in part on the static priority level of the corresponding alarm and an amount of time that has elapsed since the corresponding alarm was reported. Open state alarms are ranked according to the dynamic priority level and a notification of a highest ranked alarm is displayed.

20 Claims, 4 Drawing Sheets

METHODS AND SYSTEMS FOR DYNAMIC ALARM PRIORITIZATION IN A BUILDING CONTROL SYSTEM

TECHNICAL FIELD

The present disclosure relates to methods and systems for monitoring alarms within a building control system and more particularly to methods and systems for dynamically prioritizing alarms within a building control system.

BACKGROUND

Building control systems may include video monitoring systems, security systems including access control systems, building management systems and others. Each of these building control systems may generate alarms. It will be appreciated that a large number of alarms, ranging from critical alarms to low priority alarms, may be generated by the systems within the building control system, and that this may lead to a substantial number of alarms. It can be difficult for an operator to monitor all of these alarms. It can be difficult to keep on time of all of the alarms. What would be desirable are methods and systems for dynamically prioritizing alarms so that an operator monitoring the building control system will be more effective at managing the alarms.

SUMMARY

The present disclosure relates to methods and systems for monitoring alarms within a building control system and more particularly to methods and systems for dynamically prioritizing alarms within a building control system. An example may be found in a method for dynamically prioritizing alarms of a building control system. The method includes over time, receiving a plurality of alarms generated by the building control system. Each of the plurality of alarms is associated with one or more alarm parameters that each provide a priority factor associated with the corresponding alarm, and a time that corresponds to the time that the corresponding alarm was reported. Each of the plurality of alarms are associated with an open state until the corresponding alarm is acted upon in a predetermined manner by an operator (e.g. acknowledged the alarm, completed a Standard Operating Procedure associated with the alarm, and/or closed the alarm). For each of the plurality of alarms that remain in the open state, a static priority level is determined that is based at least in part on the priority factors provided by the one or more alarm parameters associated with the corresponding alarm. Also, a dynamic priority level is determined that is based at least in part on the static priority level of the corresponding alarm and an amount of time that has elapsed since the time that the corresponding alarm was reported. Each of the plurality of alarms that remain in the open state are ranked according to their dynamic priority level and a notification of a highest ranked alarm is displayed to the operator, sometimes in a prominent location such as along a banner on a display.

Another example may be found in a building control system for dynamically prioritizing alarms. The building control system includes a memory, a user interface including a display, and a controller operatively coupled to the memory and the user interface. The controller is configured to over time, receive a plurality of alarms generated by the building control system. Each of the plurality of alarms are associated with one or more alarm parameters that each provide a priority factor associated with the corresponding alarm. The controller is configured to record in the memory a time for each of the plurality of alarms that corresponds to the time that the corresponding alarm was reported. The controller is configured to associate each of the plurality of alarms with an open state until the building control system receives a user input via the user interface that acts upon the corresponding alarm in a predetermined manner (e.g. acknowledged the alarm, completed a Standard Operating Procedure associated with the alarm, and/or closed the alarm). For each of the plurality of alarms that remain in the open state, the controller is configured to determine a static priority level that is based at least in part on the priority factors provided by the one or more alarm parameters associated with the corresponding alarm. Also, the controller is configured to determine a dynamic priority level that is based at least in part on the static priority level of the corresponding alarm and an amount of time that has elapsed since the time that the corresponding alarm was reported. In some cases, the controller is configured to rank each of the plurality of alarms that remain in the open state according to the dynamic priority level, and to display on the display a notification of one or more of the highest ranked alarms.

Another example may be found in a non-transitory computer readable medium storing instructions that when executed by one or more processors causes the one or more processors to over time, receiving a plurality of alarms generated by a building control system. Each of the plurality of alarms is associated with one or more alarm parameters that each provide a priority factor associated with the corresponding alarm. The one or more processors are caused to recording a time for each of the plurality of alarms that corresponds to the time that the corresponding alarm was reported. The one or more processors are caused to associate each of the plurality of alarms with an open state until the corresponding alarm is acted upon in a predetermined manner by an operator (e.g. acknowledged the alarm, completed a Standard Operating Procedure associated with the alarm, and/or closed the alarm). For each of the plurality of alarms that remain in the open state, the one or more processors are caused to determine a dynamic priority level that is based at least in part on an amount of time that has elapsed since the time that the corresponding alarm was reported. In some cases, the one or more processors are caused to rank each of the plurality of alarms that remain in the open state according to the dynamic priority level and to display a notification of one or more highest ranked alarms.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
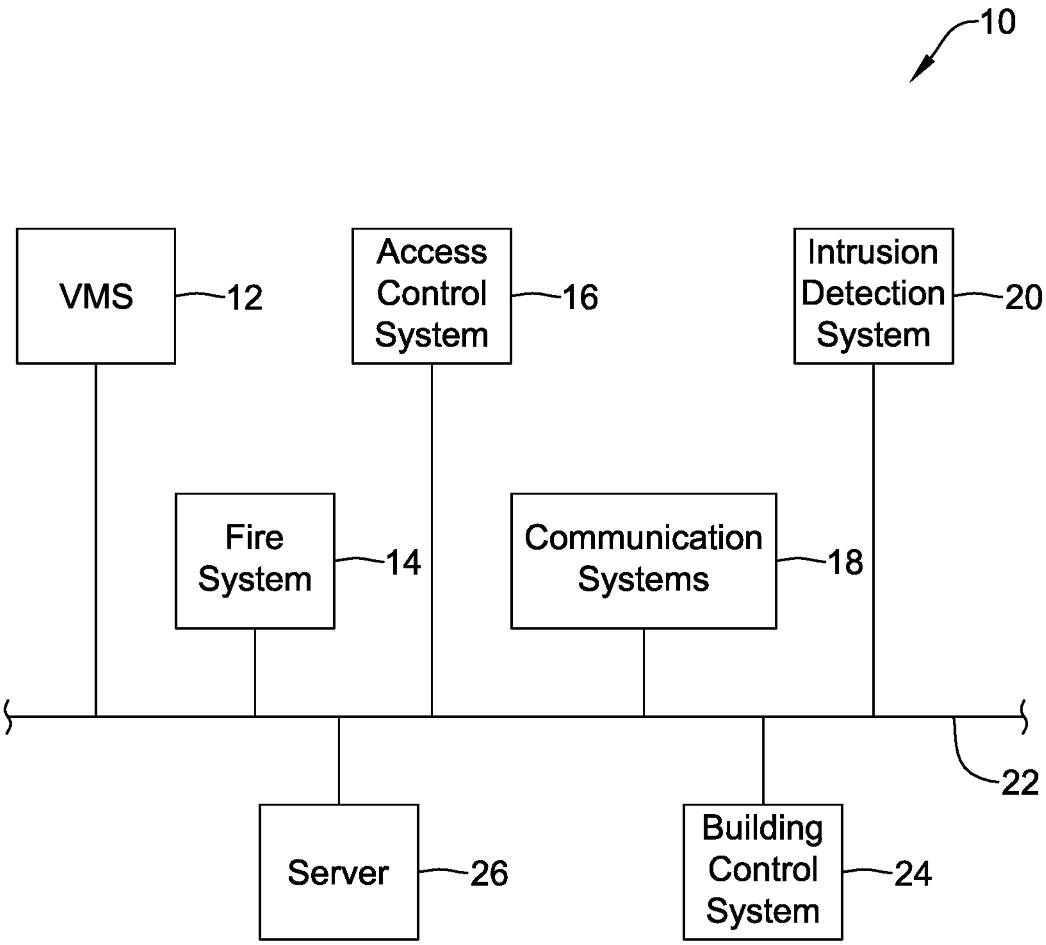
FIG. 1 is a schematic block diagram showing an illustrative building system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative building system 10 that may be implemented or deployed within a building or other facility. In some instances, the building system 10 may be implemented or deployed within a prison, for example. The illustrative building system 10 includes a number of individual systems that contribute to safely and efficiently operating the building or other facility. For example, the building system 10 may include a VMS (Video Monitoring System) 12 that includes a number of cameras distributed around the building or other facility, and that employs video analytics algorithms to monitor video streams from each of the cameras to look for possible problems. The VMS 12 may include PTZ (Pan Tilt Zoom) cameras, PTZ cameras with built-in IR (InfraRed—night vision) capabilities, fixed dome cameras, thermal cameras and IR cameras.

The building system 10 may include a fire system 14 that includes multiple sensors for detecting signs of fire, such as smoke detectors. The fire system 14 may include a fire system panel that is operably coupled with all of the smoke detectors and may be configured to receive alarms from the detectors. The fire system 14 may also include a fire suppression system, such as a sprinkler system.

The building system 10 may include an access control system 16 that monitors and controls access within the building or other facility. In some instances, the access control system 16 may include card readers or other ways of limiting access to spaces within the building or other facility. In some instances, the access control system 16 may rely upon cameras for granting or denying access. The access control system 16 may include a number of doors having remotely operated locks secured to the doors.

The building system 10 may include a communication system 18. The communication system 18 may include an intercom system within the building or facility. The communication system 18 may include mobile radios. The communication system 18 may include a PA (Public Announcement) system, for example.

The building system 10 may include an intrusion detection system 20. The intrusion detection system 20 may include a number of sensors such as door sensors, window sensors, motion sensors such as PIR (Passive InfraRed) sensors, vibration sensors, glass break detectors and other sensors that can detect indications of intrusion, and visual annunciators, for example.

Each of the VMS 12, the fire system 14, the access control system 16, the communication system 18 and the intrusion detection system 20, as well as any other building systems not shown in FIG. 1, may be operably coupled with a building network 22. In some instances, the building network 22 may be an SCN (Secure Communication Network). In some instances, the building network 22 may be a wired network. In some instances, the building network 22, or at least portions thereof, may be a wireless network, communicating over any of a variety of different wireless communication protocols. Examples of other systems that may be included include biometric identification systems, contraband detection systems, prisoner movement and identification systems, accoutrement and key management systems, anti-vehicle ramming systems, and mobile duress alarm systems.

A building control system 24 is operably coupled with the building network 22 and thus is able to receive alarms that are raised by any of the VMS 12, the fire system 14, the access control system 16, the communication system 18 and/or the intrusion detection system 20, as well as any other building systems not pictured, and to prioritize these alarms. In some instances, a server 26 may also be operably coupled with the building network 22. In some instances, the building control system 24 may be disposed within the building or other facility. In some instances, the building control system 24 may be remote from the building or other facility, and may for example be implemented within the server 26. In some instances, the building control system 24 may encompass or include one or more of the VMS 12, the fire system 14, the access control system 16, the communication system 18 and the intrusion detection system 20, as well as any other building systems not pictured.

Figure 2:
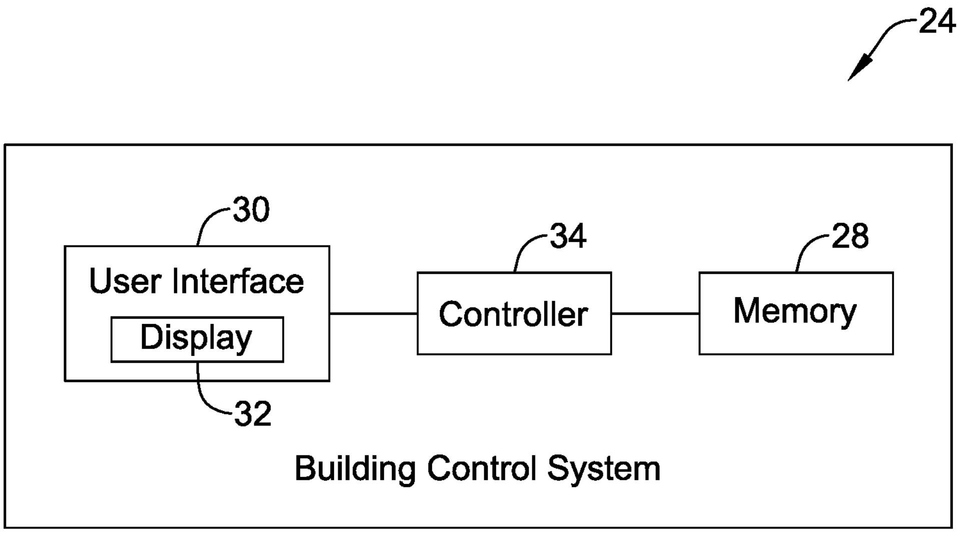
FIG. 2 is a schematic block diagram showing an illustrative building control system forming part of the illustrative building system of FIG. 1.

FIG. 2 is a schematic block diagram of the illustrative building control system 24. As an example, the building control system 24 may include a memory 28, a user interface 30 that includes a display 32, and a controller 34 that is operably coupled to the memory 28 and to the user interface 30. The user interface 30 may be configured to allow a user to enter information, such as with a keyboard, mouse, track ball and the like. The display 32 may be configured to allow the controller 34 to generate and display dashboards on the display 32 that alert the user (e.g. operator) to various alarms. The display 32 may be configured to allow the controller 34 to display various screens soliciting configuration and other information from the user for one or more of the VMS 12, the fire system 14, the access control system 16, the communication system 18 and the intrusion detection system 20, as well as any other building systems not pictured.

The controller 34 is configured to receive over time a plurality of alarms generated by the building control system 24. This may include alarms from one or more of the VMS 12, the fire system 14, the access control system 16, the communication system 18 and the intrusion detection system 20, as well as any other building systems not pictured. Each of the plurality of alarms is associated with one or more alarm parameters that each provide a priority factor associated with the corresponding alarm. Also, a time for each of the plurality of alarms that corresponds to the time that the corresponding alarm was reported is record in the memory 28. The controller 34 is configured to associate each of the plurality of alarms with an open state (e.g. open alarm state) until the building control system 24 receives a user input via the user interface 30 that acts upon the corresponding alarm in a predetermined manner (e.g. acknowledged the alarm, completed a Standard Operating Procedure associated with the alarm, and/or closed the alarm). For each of the plurality of alarms that remain in the open state, the controller 34 may be configured to determine a static priority level that is based at least in part on the priority factors provided by the one or more alarm parameters associated with the corresponding alarm, and to determine a dynamic priority level that is based at least in part on the static priority level of the corresponding alarm and an amount of time that has elapsed since the time that the corresponding alarm was reported. The controller 34 may then rank each of the plurality of alarms that remain in the open state according to the dynamic priority level and to display on the display 32 a notification of one or more of the highest ranked alarms.

In some instances, the plurality of alarms generated by the building control system 24 may include alarms of different alarm factors such as an Alarm Priority Factor, a Zone Priority Factor and a Threshold Time Cut Off Factor. For the Alarm Priority Factor, one of the one or more alarm parameters may provide an alarm priority classification (e.g. Critical alarm, Urgent Alarm, Medium Alarm and Low Alarm), and an alarm priority value (e.g. numeric value) that is based at least in part on the alarm priority classification of the corresponding alarm. In some instances, the plurality of alarms generated by the building control system 24 may include alarms from different zones of the building control system 24. In such cases, and for the Zone Priority Factor, one of the one or more alarm parameters may provide a zone priority classification (e.g. Critical Zone or Non-Critical Zone), and a zone priority value (e.g. numeric value) that is based at least in part on the zone priority classification of the corresponding alarm.

In some instances, another alarm factor corresponds to the time of day that a particular alarm was raised. As an example, a particular alarm raised during daylight hours may have a relatively lower priority, while the same alarm raised during overnight hours may have a relatively higher priority. As another example, a particular alarm raised during fully staffed periods of time may have a relatively lower priority, while the same alarm raised during times of partial staffing may have a relatively higher priority because it may be more difficult to respond if a situation escalates, for example.

In some instances, the particular building system that triggered an alarm may impact the relative priority of that alarm. As an example, an alarm triggered by a security system such as a video management system (VMS) may have a relatively higher priority when compared to an alarm triggered by a building management system (BMS). In particular, an alarm raised by the VMS may have more security implications than an alarm raised by the BMS.

In some instances, the amount of time that has elapsed since the time that the corresponding alarm was reported and remains in an open state is expressed as a number of consecutive pre-defined time periods that have transpired since the time that the corresponding alarm was reported. For the Threshold Time Cut Off Factor, one of the one or more alarm parameters may provide different pre-defined time periods for different alarm priority classifications (e.g. Critical alarm, Urgent Alarm, Medium Alarm and Low Alarm). For example, an alarm that has an alarm priority classification of Critical may be associated with a pre-defined time period of ten (10) minutes, an alarm that has an alarm priority classification of Urgent may be associated with a pre-defined time period of thirty (30) minutes, an alarm that has an alarm priority classification of Medium may be associated with a pre-defined time period of forty-five (45) minutes, and an alarm that has an alarm priority classification of Low may have a pre-defined time period of sixty (60) minutes. A number of different other factors may be considered including, for example, a zone-specific priority parameter, an alarm time of day priority parameter (whether the alarm is during day or at night, for example), a sub-system priority parameter (e.g. the sub-system that reported the alarm may have a higher priority than another sub-system), an alarm default priority and/or any other suitable factor. These are just examples.

The following example illustrates some of the functionality that may be implemented by the controller 34. The first table provides several alarm factors including an Alarm Priority Factor, a Zone Priority Factor and a Threshold Time Cut Off Factor. Associated with each alarm factor are alarm priority classifications (e.g. Critical alarm, Urgent Alarm, Medium Alarm and Low Alarm) and an alarm priority value (e.g. numeric value) that is based at least in part on the alarm priority classification of the corresponding alarm. Also shown are customer defined weightage assigned to each of the alarm factors. In this example, the customer has assigned equal weights (e.g. 25) to each of the alarm factors:

| Factor | Factor Classification | Factor Type System Value | Customer Weightage |
|---|---|---|---|
| Alarm Priority | Critical | 4 | W1 = 25 |
| | Urgent | 3 | |
| | Medium | 2 | |
| | Low | 1 | |
| Zone Priority | Critical | 2 | W2 = 25 |
| | Non Critical | 1 | |
| Threshold Time Cut off | Critical (10 mins) | 5 | W3 = 25 |
| | Urgent (30 mins) | 4 | |
| | Medium (45 mins) | 3 | |
| | Low (60 mins) | 2 | |

In this example, the following equation may be used by the controller 34 to calculate a numerical score for the alarm factor for each of the pending alarms:

$$\text{Calculated Alarm Priority Factor} = (\text{alarm Priority} * W1) + (\text{Zone Priority} * W2) + (\text{Threshold Time Cutoff} * W3 * \text{Slipped Time Periods})$$

The next table provides example numerical results for a building control system with four open alarms. In the first cycle (e.g. a first cycle may correspond to an 8 hour shift), there is a critical alarm A1 with a Calculated Alarm Priority Factor of 150, an urgent alarm A2 with a Calculated Alarm Priority Factor of 125, and a low-priority alarm A3 with a Calculated Alarm Priority Factor of 50. In the second cycle (e.g. the next 8 hour shift), the alarm A3 remains open, but now has a Calculated Alarm Priority Factor of 200 because the alarm A3 remains open for a total of three pre-defined time periods of sixty (60) minutes, or a total of three hours as the pre-defined time period for a low priority alarm is 60 minutes.

| Site | Alarm | Priority | | Zone | | Threshold Time Cut off | | Alarm Factor |
|---|---|---|---|---|---|---|---|---|
| | | | | First Cycle | | | | |
| Site 1 | A1 | Critical | 4 | Critical | 2 | 0 time periods slipped | 0 | 150 |
| Site 1 | A2 | Urgent | 3 | Critical | 2 | 0 time periods slipped | 0 | 125 |
| Site 1 | A3 | Low | 1 | Non Critical | 1 | 0 time periods slipped | 0 | 50 |
| | | | | Second Cycle | | | | |
| Site 1 | A3 | Low | 1 | Non Critical | 1 | 3 time periods slipped | 6 | 200 |

Figure 3:
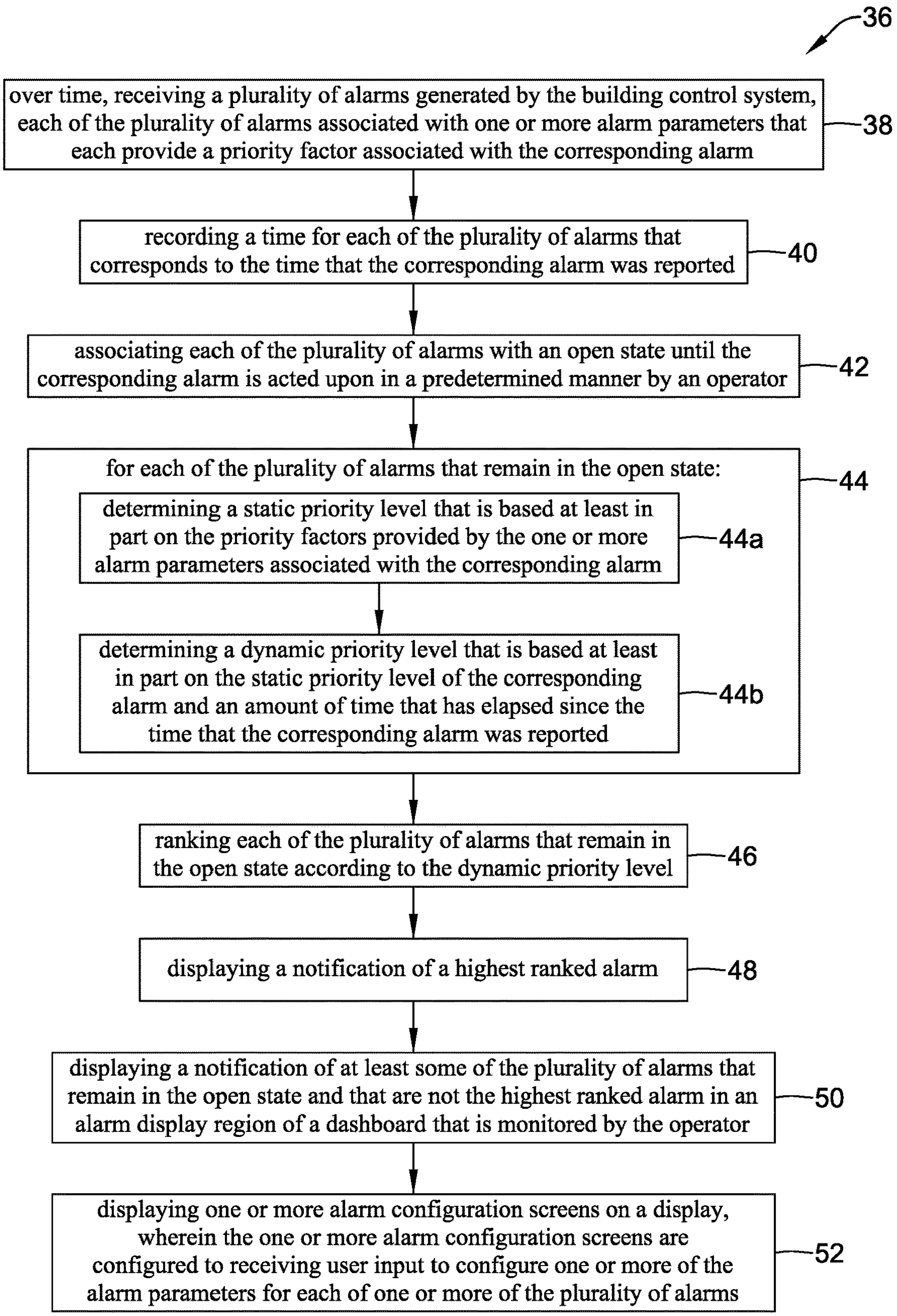
FIG. 3 is a flow diagram showing an illustrative method for dynamically prioritizing alarms of a building control system.

FIG. 3 is a flow diagram showing an illustrative method 36 for dynamically prioritizing alarms of a building control system (such as the building control system 24). The method 36 includes over time, receiving a plurality of alarms generated by the building control system, each of the plurality of alarms associated with one or more alarm parameters that each provide a priority factor associated with the corresponding alarm, as indicated at block 38. In some instances, the plurality of alarms generated by the building control system may include alarms of different alarm types, and wherein one of the one or more alarm parameters provides an alarm priority factor that is based at least in part on the alarm type of the corresponding alarm. In some instances, the plurality of alarms generated by the building control system may include alarms from different zones of the building control system, and wherein one of the one or more alarm parameters provides a zone priority factor that is based at least in part on the zone that the corresponding alarm originated.

A time is recorded for each of the plurality of alarms that corresponds to the time that the corresponding alarm was reported, as indicated at block 40. In some instances, the amount of time that has elapsed since the time that the corresponding alarm was reported may be expressed as a number of consecutive pre-defined time periods that have transpired since the time that the corresponding alarm was reported while remaining open. One of the one or more alarm parameters may provide the pre-defined time period for the corresponding alarm. The pre-defined time period may be different for different alarms.

Each of the plurality of alarms are associated with an open state until the corresponding alarm is acted upon in a predetermined manner by an operator (e.g. acknowledged the alarm, completed a Standard Operating Procedure associated with the alarm, and/or closed the alarm), as indicated at block 42. For each of the plurality of alarms that remain in the open state, several priority levels are determined, as indicated at block 44. A static priority level is determined based at least in part on the priority factors provided by the one or more alarm parameters associated with the corresponding alarm, as indicated at block 44*a*. In one example, the static priority level may correspond to the (alarm Priority*W1)+(Zone Priority*W2) in the above equation for the Calculated Alarm Priority Factor. A dynamic priority level is determined based at least in part on the static priority level of the corresponding alarm and an amount of time that has elapsed since the time that the corresponding alarm was reported, as indicated at block 44*b*. In one example, the dynamic priority level may correspond to the static priority level+(Threshold Time Cutoff*W3*Slipped Time Periods) in the above equation for the Calculated Alarm Priority Factor.

Each of the plurality of alarms that remain in the open state may be ranked according to the dynamic priority level (e.g. the Calculated Alarm Priority Factor), as indicated at block 46. In some instances, each of the plurality of alarms may be associated with two or more alarm parameters that each provide a corresponding priority factor for the corresponding alarm, and wherein determining the static priority level is based at least in part on a weighted sum of at least two of the priority factors provided by two or more alarm parameters associated with the corresponding alarm. In some instances, determining the dynamic priority level may be based at least in part on a weighted sum of the static priority level of the corresponding alarm and the amount of time that has elapsed since the time that the corresponding alarm was reported.

A notification of a highest ranked alarm may be displayed on the display 32 of the building control system, as indicated at block 48. In some instances, displaying the notification of the highest ranked alarm may include displaying the notification of the highest ranked alarm in a ribbon that extends across a top portion of a dashboard that is displayed on the display 32 and monitored by the operator. In some instances, displaying the notification of the highest ranked alarm may include displaying the notification in a blinking fashion on a dashboard that is monitored by the operator.

In some instances, the method 36 may include displaying a notification of at least some of the plurality of alarms that remain in the open state and that are not the highest ranked alarm in an alarm display region of a dashboard that is monitored by the operator, as indicated at block 50. In some instances, the method 36 may further include displaying one or more alarm configuration screens on a display, wherein the one or more alarm configuration screens are configured to receiving user input to configure one or more of the alarm parameters for each of one or more of the plurality of alarms.

Figure 4:
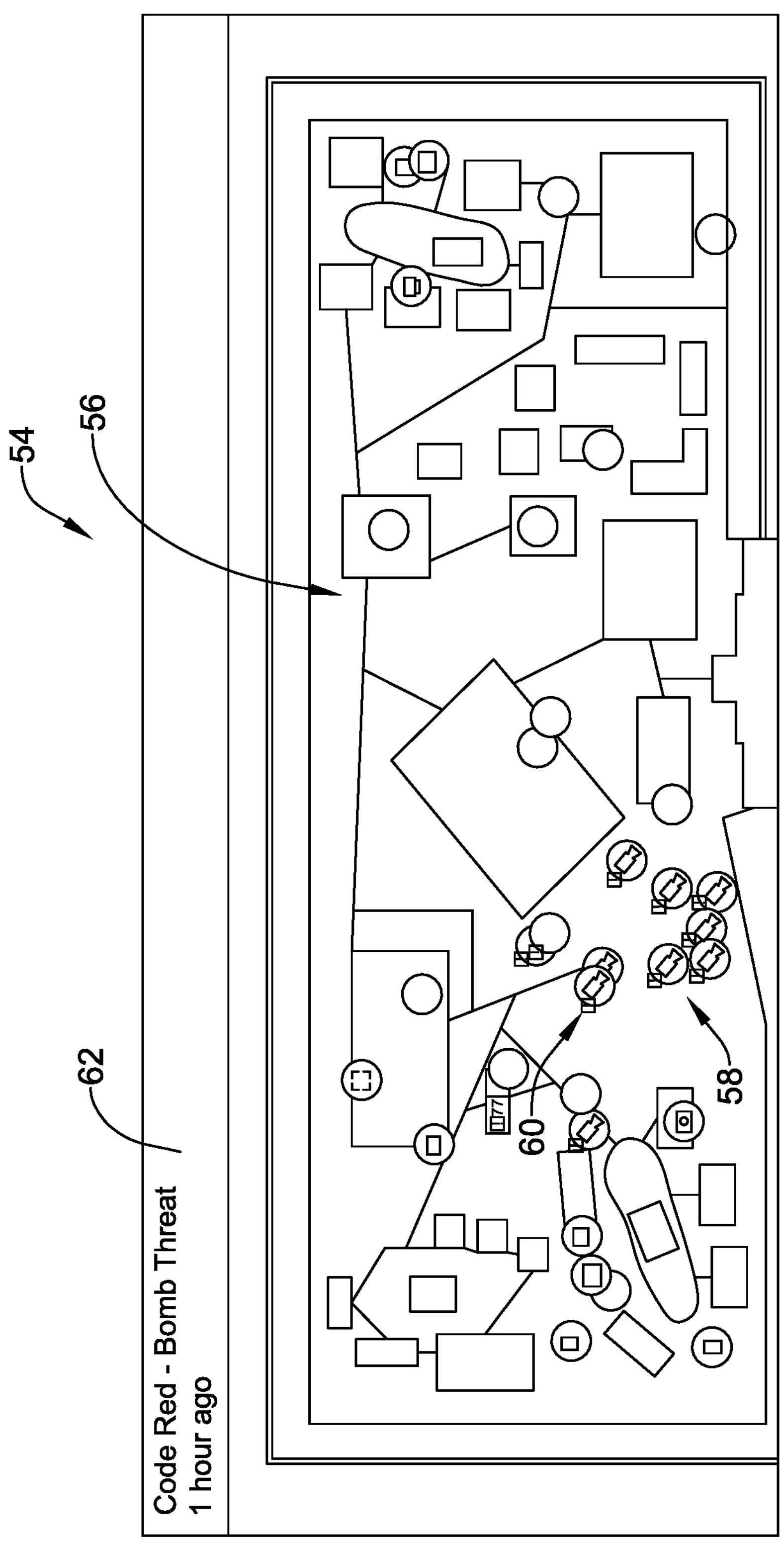
FIG. 4 is a dashboard displayable by the illustrative building control system of FIG. 2.

FIG. 4 is a screen shot showing an illustrative dashboard 54 that may be generated by the controller 34 and displayed on the display 32. The dashboard 54 includes a graphical representation 56 of the building or other facility. In this example, the building or other facility is a prison, and thus includes a number of buildings that are distributed within a secured perimeter. Near the middle of the graphical representation 56, it can be seen that several cameras 58 are displaying alarm notifications 60. These may represent alarms of any priority. However, the dashboard 54 includes a ribbon 62 that is displayed across the top of the dashboard 54, indicating that the current alarm with the highest Calculated Alarm Priority Factor is currently a Bomb Threat. If another alarm gains a higher Calculated Alarm Priority Factor while the Bomb Threat is still active, that other alarm will replace the Bomb Threat off of the ribbon 62. In some cases, because of the dynamic prioritization of the alarms, a low priority alarm may eventually become the highest priority alarm (e.g. has the highest Calculated Alarm Priority Factor) if the low priority alarm remains in an open state for a sufficient number of corresponding pre-defined time periods. This helps ensure that all alarms, even low priority alarms, will be brought to the attention of the operator and ultimately addressed in a timely manner.

It will be appreciated that the graphical representation 45 may take any of a variety of forms. In some instances, a user may be able to zoom in to a particular area of the prison, for example, and may be able to see greater detail. In some instances, the user may be able to click on one of the alarm notifications 60 in order to gain more details regarding a possible alarm. In some instances, a user may be able to click on one of the alarm notifications 60 in order to acknowledge the alarm, for example, or to silence the alarm.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed:

1. A method for dynamically prioritizing alarms of a building control system, the method comprising:

over time, receiving a plurality of alarms generated by the building control system, each of the plurality of alarms associated with one or more alarm parameters that each provide a priority factor associated with the corresponding alarm;

recording a time for each of the plurality of alarms that corresponds to the time that the corresponding alarm was reported;

associating each of the plurality of alarms with an open state until the corresponding alarm is acted upon in a predetermined manner by an operator;

for each of the plurality of alarms that remain in the open state:

determining a static priority level that is based at least in part on the priority factors provided by the one or more alarm parameters associated with the corresponding alarm;

determining a dynamic priority level that is based at least in part on the static priority level of the corresponding alarm and an amount of time that has elapsed since the time that the corresponding alarm was reported;

ranking each of the plurality of alarms that remain in the open state according to the dynamic priority level; and displaying a notification of a highest ranked alarm.

2. The method of claim 1, wherein the plurality of alarms generated by the building control system comprises alarms of different alarm types, and wherein one of the one or more alarm parameters provides an alarm priority factor that is based at least in part on the alarm type of the corresponding alarm.

3. The method of claim 1, wherein the plurality of alarms generated by the building control system comprises alarms from different zones of the building control system, and wherein one of the one or more alarm parameters provides a zone priority factor that is based at least in part on the zone in which the corresponding alarm originated.

4. The method of claim 1, wherein the amount of time that has elapsed since the time that the corresponding alarm was reported is expressed as a number of consecutive pre-defined time periods that have transpired since the time that the corresponding alarm was reported.

5. The method of claim 4, wherein one of the one or more alarm parameters provides the pre-defined time period for the corresponding alarm.

6. The method of claim 1, wherein each of the plurality of alarms is associated with two or more alarm parameters that each provide a corresponding priority factor for the corresponding alarm, and wherein determining the static priority level is based at least in part on a weighted sum of at least two of the priority factors provided by two or more alarm parameters associated with the corresponding alarm, wherein weighting values used in determining the weighted sum are user-definable.

7. The method of claim 6, determining the dynamic priority level is based at least in part on a weighted sum of the static priority level of the corresponding alarm and the amount of time that has elapsed since the time that the corresponding alarm was reported.

8. The method of claim 1, wherein displaying the notification of the highest ranked alarm comprises displaying the notification of the highest ranked alarm in a ribbon that extends across a top portion of a dashboard that is monitored by the operator.

9. The method of claim 1, wherein displaying the notification of the highest ranked alarm comprises displaying the notification in a blinking fashion on a dashboard that is monitored by the operator.

10. The method of claim 1, further comprising displaying a notification of at least some of the plurality of alarms that remain in the open state and that are not the highest ranked alarm in an alarm display region of a dashboard that is monitored by the operator.

11. The method of claim 1, further comprising:

displaying one or more alarm configuration screens on a display, wherein the one or more alarm configuration screens are configured to receiving user input to configure one or more of the alarm parameters for each of one or more of the plurality of alarms.

12. A building control system for dynamically prioritizing alarms, the building control system comprising:

a memory;

a user interface including a display;

a controller operatively coupled to the memory and the user interface, the controller configured to:

over time, receive a plurality of alarms generated by the building control system, each of the plurality of alarms associated with one or more alarm parameters that each provide a priority factor associated with the corresponding alarm;

record in the memory a time for each of the plurality of alarms that corresponds to the time that the corresponding alarm was reported;

associate each of the plurality of alarms with an open state until the building control system receives a user input via the user interface that acts upon the corresponding alarm in a predetermined manner;

for each of the plurality of alarms that remain in the open state, the controller is configured to:

determine a static priority level that is based at least in part on the priority factors provided by the one or more alarm parameters associated with the corresponding alarm;

determine a dynamic priority level that is based at least in part on the static priority level of the corresponding alarm and an amount of time that has elapsed since the time that the corresponding alarm was reported;

rank each of the plurality of alarms that remain in the open state according to the dynamic priority level; and display on the display a notification of a highest ranked alarm.

13. The building control system of claim 12, wherein the plurality of alarms generated by the building control system comprises alarms of different alarm types, and wherein one of the one or more alarm parameters provides an alarm priority factor that is based at least in part on the alarm type of the corresponding alarm.

14. The building control system of claim 12, wherein the plurality of alarms generated by the building control system comprises alarms from different zones of the building control system, and wherein one of the one or more alarm parameters provides a zone priority factor that is based at least in part on the zone that the corresponding alarm originated.

15. The building control system of claim 12, wherein the amount of time that has elapsed since the time that the corresponding alarm was reported is expressed as a number of consecutive pre-defined time periods that have transpired since the time that the corresponding alarm was reported.

16. The building control system of claim 15, wherein one of the one or more alarm parameters provides the pre-defined time period for the corresponding alarm.

17. A non-transitory computer readable medium storing instructions that when executed by one or more processors causes the one or more processors to:

over time, receive a plurality of alarms generated by a building control system, each of the plurality of alarms associated with one or more alarm parameters that each provide a priority factor associated with the corresponding alarm;

record a time for each of the plurality of alarms that corresponds to the time that the corresponding alarm was reported;

associate each of the plurality of alarms with an open state until the corresponding alarm is acted upon in a predetermined manner by an operator;

for each of the plurality of alarms that remain in the open state:

determine a dynamic priority level that is based at least in part on an amount of time that has elapsed since the time that the corresponding alarm was reported;

rank each of the plurality of alarms that remain in the open state according to the dynamic priority level; and display a notification of a highest ranked alarm.

18. The non-transitory computer readable medium of claim 17, wherein the one or more processors are further caused to:

determine a static priority level that is based at least in part on the priority factors provided by the one or more alarm parameters associated with the corresponding alarm; and determine the dynamic priority level that is based at least in part on the static priority level of the corresponding alarm and the amount of time that has elapsed since the time that the corresponding alarm was reported.

19. The non-transitory computer readable medium of claim 18, wherein the plurality of alarms generated by the building control system comprises alarms of different alarm types, and wherein one of the one or more alarm parameters provides an alarm priority factor that is based at least in part on the alarm type of the corresponding alarm.

20. The non-transitory computer readable medium of claim 18, wherein the plurality of alarms generated by the building control system comprises alarms from different zones of the building control system, and wherein one of the one or more alarm parameters provides a zone priority factor that is based at least in part on the zone that the corresponding alarm originated.

* * * * *